US011263721B2

(12) United States Patent
Lades et al.

(10) Patent No.: US 11,263,721 B2
(45) Date of Patent: Mar. 1, 2022

(54) METHOD AND DATA PROCESSING SYSTEM FOR PROVIDING A TWO-DIMENSIONAL UNFOLDED IMAGE OF AT LEAST ONE TUBULAR STRUCTURE

(71) Applicant: Siemens Healthcare GmbH, Erlangen (DE)

(72) Inventors: Felix Lades, Erlangen (DE); Max Schoebinger, Hirschaid (DE); Michael Suehling, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/953,456

(22) Filed: Nov. 20, 2020

(65) Prior Publication Data
US 2021/0166342 A1 Jun. 3, 2021

(30) Foreign Application Priority Data
Nov. 29, 2019 (EP) ..................... 19212538

(51) Int. Cl.
*G06T 3/00* (2006.01)
*G06T 3/40* (2006.01)
(52) U.S. Cl.
CPC .............. *G06T 3/0037* (2013.01); *G06T 3/40* (2013.01); *G06T 2200/04* (2013.01); *G06T 2200/24* (2013.01)
(58) Field of Classification Search
CPC ..... G06T 3/0037; G06T 3/40; G06T 2200/04; G06T 2200/24; G06T 19/00; G06T 2219/021; G06T 17/00
See application file for complete search history.

(56) References Cited

U.S. PATENT DOCUMENTS 6,345,112 B1 * 2/2002 Summers ........... G06K 9/00201
382/128
7,447,535 B2 11/2008 Lavi
(Continued)

OTHER PUBLICATIONS

Sorkine O. et. al., "As-Rigid-As-Possible Surface Modeling.", Eurographics/ACM SIGGRAPH Symposium on Geometry Processing, pp. 109-116. (Year: 2007).*
(Continued)

*Primary Examiner* — Michael Le
(74) *Attorney, Agent, or Firm* — Harness, Dickey & Pierce, PL.C.

(57) ABSTRACT

A computer-implemented method is for providing a two-dimensional unfolded image of at least one tubular structure. In an embodiment, the method includes receiving three-dimensional image data of an examination region including the at least one tubular structure; selecting a set of input points in the three-dimensional image data; determining a projection surface with respect to the three-dimensional image data; calculating a set of surface points of the projection surface; calculating a deformed projection surface by applying a deformation algorithm onto the projection surface; calculating a set of voxel positions with respect to the three-dimensional image data based on the deformed projection surface; and calculating the two-dimensional unfolded image of the at least one tubular structure based on the three-dimensional image data and the set of voxel positions.

20 Claims, 8 Drawing Sheets

(56) References Cited

U.S. PATENT DOCUMENTS

| | | | | |
|---|---|---|---|---|
| 2003/0053697 | A1* | 3/2003 | Aylward | G06T 7/64 |
| | | | | 382/203 |
| 2006/0229513 | A1* | 10/2006 | Wakai | G06T 7/11 |
| | | | | 600/407 |
| 2006/0238534 | A1* | 10/2006 | Matsumoto | G06T 19/00 |
| | | | | 345/420 |
| 2009/0136103 | A1* | 5/2009 | Sonka | G06K 9/6224 |
| | | | | 382/128 |
| 2010/0191102 | A1* | 7/2010 | Steinberg | A61B 17/1204 |
| | | | | 600/424 |
| 2011/0122134 | A1* | 5/2011 | Shinagawa | G06T 3/0031 |
| | | | | 345/424 |
| 2012/0172700 | A1* | 7/2012 | Krishnan | G16H 30/20 |
| | | | | 600/407 |
| 2018/0070903 | A1* | 3/2018 | Maeda | G06T 7/0014 |
| 2019/0057541 | A1 | 2/2019 | Li et al. | |

OTHER PUBLICATIONS

Kanitsar.A. et al. "CPR—Curved Planar Reformation" IEEE Visualization 2002; Proceedings; Oct. 27-Nov. 1, 2002; [ Annual IEEE Conference on Visualization], pp. 37-44; 2002//ISBN:978-0-7803-7498-0. (Year: 2002).*

Kretschmer Jan et al: "ADR—Anatomy-Driven Reformation", IEEE Transactions on Visualization and Computer Graphics, IEEE Service Center, Los Alamitos, CA, US, vol. 20, No. 12, Dec. 31, 2014 (Dec. 31, 2014), pp. 2496-2505, XP011563302, ISSN: 1077-2626, DOI: 10.1109/TVCG.2014.2346405 [retrieved on Oct. 23, 2014] * abstract; figures 2,4, 8 * * section 4 * * section 2 *; 2014.

Lavi G: "Mapping the coronary arteries on 1-5, a sphere in CT angiography", 13-17 Proceedings of SPIE/ IS & T,, vol. 5367, May 25, 2004 (May 25, 2004), pp. 285-293, XP002327352, DOI: 10.1117/12.534571 ISBN: 978-1-62841-730-2 * abstract *.

Raff G. L. et. al., "SCCT guidelines for the interpretation and reporting of coronary computed tomographic angiography.", Journal of Car-diovascular Computed Tomography 3, pp. 122-136, 2009.

Kanitsar, Armin et al. "Advanced Curved Planar Reformation: Flattening of Vascular Structures", Inst. of Computer Graphics and Algorithms, Vienna University of Technology, XP031173479; pp. 43-50; DOI: 10.1109/VISUAL.2003.1250353; ISBN: 978-0-7803-8120-9;VIS 2003. IEEE Visualization 2003; Proceedings. Seattle, WA, Oct. 19-24, 2003.

Kanitsar, A. et al. "CPR—Curved Planar Reformation" IEEE Visualization 2002; Proceedings; Oct. 27-Nov. 1, 2002; [Annual IEEE Conference on Visualization], pp. 37-44; 2002// ISBN: 978-0-7803-7498-0.

Bernhard Stimpel: "Automated Curved and Multiplanar Reformation for Screening of the Proximal Coronary Arteries in MR Angiography", Oct. 23, 2018 (Oct. 23, 2018), XP055689500, DOI: 10.3390/jimaging4110124 Retrieved from the Internet: URL:http://dx.doi.org/10.3390/jimaging4110 124 [retrieved on Apr. 27, 2020] * abstract * * section 3.7-3.8 *; 2018.

Sorkine O. et. al., "As-Rigid-As-Possible Surface Modeling.", Eurographics/ACM SIGGRAPH Symposium on Geometry Processing, pp. 109-116, 2007.

* cited by examiner

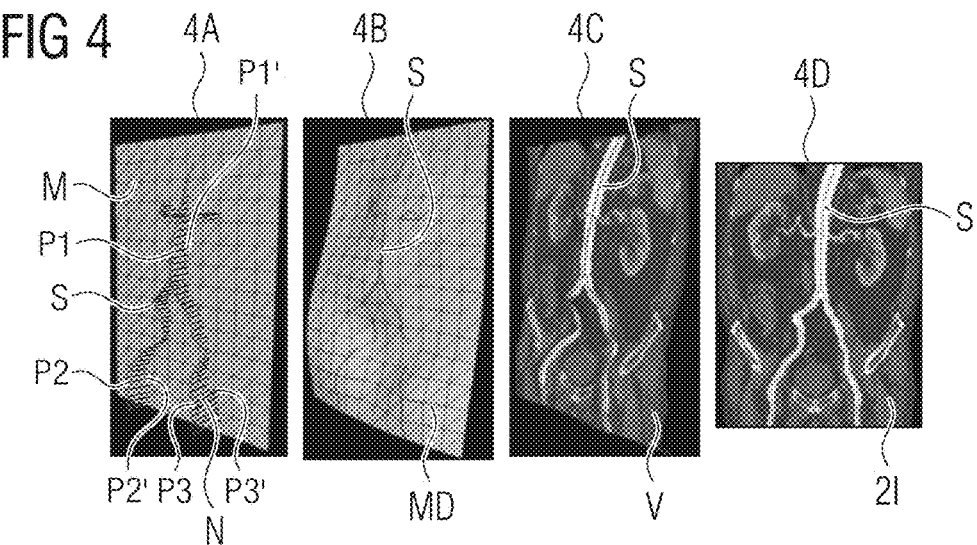
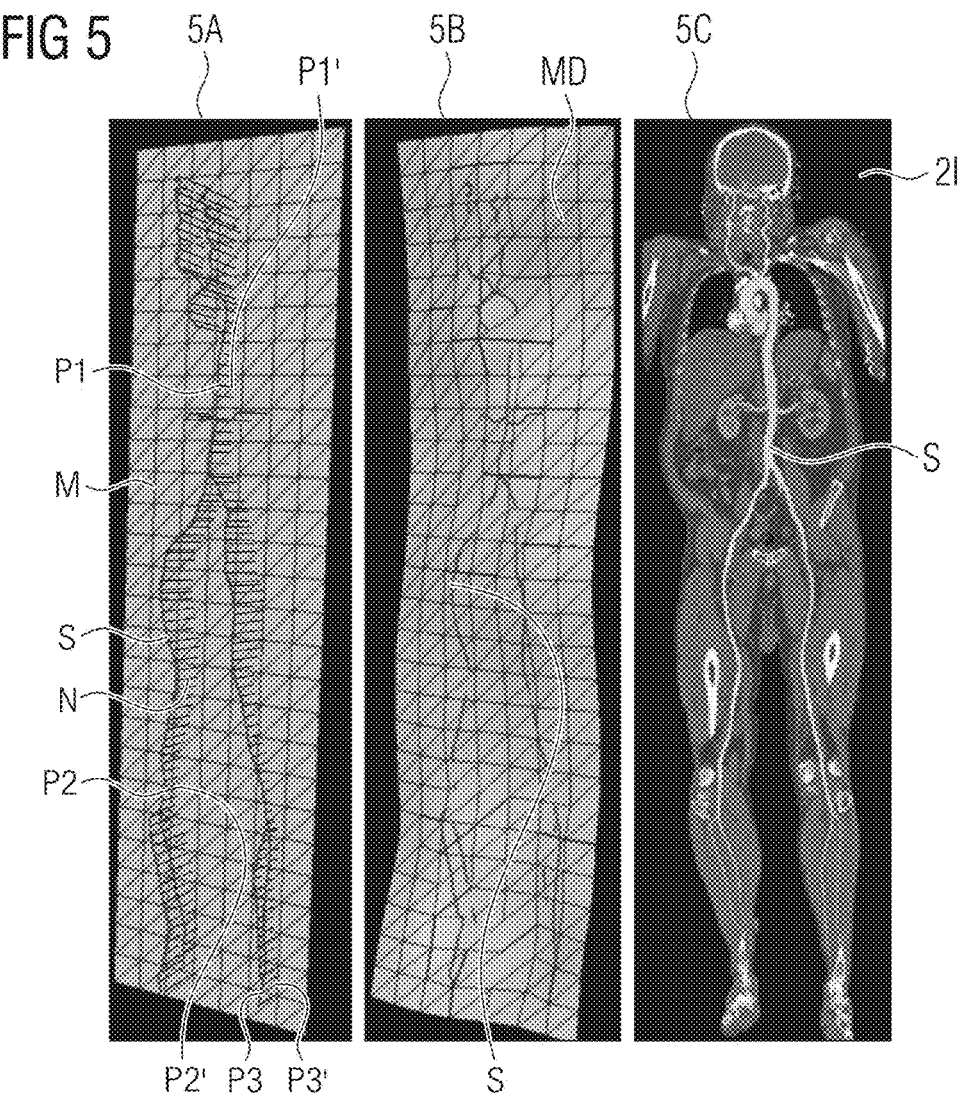

METHOD AND DATA PROCESSING SYSTEM FOR PROVIDING A TWO-DIMENSIONAL UNFOLDED IMAGE OF AT LEAST ONE TUBULAR STRUCTURE

PRIORITY STATEMENT

The present application hereby claims priority under 35 U.S.C. § 119 to European patent application number EP19212538.3 filed Nov. 29, 2019, the entire contents of which are hereby incorporated herein by reference.

FIELD

An example embodiment of the application generally relates to a computer-implemented method for providing a two-dimensional unfolded image of at least one tubular structure. In other embodiments, the invention generally relates to a data processing system, to a medical imaging device, to a computer program product and to a computer-readable medium.

BACKGROUND

To investigate vascular diseases, radiologists often need to look at multiple vessels belonging to a common vessel tree. This vessel tree in general has a complex three-dimensional structure which makes reading quite difficult and requires increased cognitive effort.

Classic reading methods involve investigating a stack of multiplanar reconstructed (MPR) slices which requires lots of cognitive effort, since the relevant information is spread over the whole stack of slices. Classic methods to create overview images of the whole vessel tree include volume rendering technique (VRT) or maximum intensity projection (MIP).

While VRT can't visualize the original CT values within the vessel, MIP might omit low-density soft plaque lesions.

Using a curved MPR (CPR), single vessels can be visualized from a certain viewing angle. Interactive rotation of the CPR enables the option to investigate the vessel from different viewing angles. However, the method only visualizes a single vessel.

Recently, various extensions to the classic CPR have been published [FIG. 1]. All share the same goal of visualizing multiple vessels in a single image. In the next sections, we will first discuss the general extensions, and then discuss extensions which have been proposed specifically for the rendering of coronary vasculature.

Multi-path CPR [Reference 1] allows to visualize several vessels in a single picture. To avoid overlaps between the vessels, untangled multi-path CPR [Reference 2] has been proposed.

Both methods stick single CPR views together in a common picture. The output image is partitioned into distinct vessel regions, where each region includes the CPR of the corresponding vessel. This leads to border artifacts between the single regions, which may hamper the clinical acceptance of those methods. The more complex the tree is, the more region border artifacts will appear in the output image. Therefore, a smooth and artifact-free visualization of the vessel tree is desirable.

A visualization with normalized orientation, but also including patient-specific anatomy and corresponding CT HU values is preferable. Thus, in the past there were already multiple methods proposed which facilitate the visualization of multiple coronary vessels in a single image.

U.S. Pat. No. 7,447,535B2 [Reference 3, Reference 6] includes a system to display a vessel tree oriented around a spherical or ellipsoidal base surface. The presented method applies ray casting. Different kinds of artifacts can arise, like e.g. conflicting vessel parts overlapping each other, or vessel parts very far from the projection center being distorted due to smaller projection angles.

Patent US20190057541A1 [Reference 7] also focuses on unfolding the coronary arteries on a 2D view. It uses half-ray intersections with a mesh for any pixel.

SUMMARY

The inventors have discovered that an underlying technical problem is to facilitate an improved unfolding of at least one tubular anatomical structure. This problem is improved upon or even solved by the subject matter at least one embodiment of the application. The claims are related to further embodiments of the invention.

In one embodiment, the invention relates to a computer-implemented method for providing a two-dimensional unfolded image of at least one tubular structure, the method comprising:
  receiving three-dimensional image data of an examination region comprising the at least one tubular structure,
  selecting a set of input points in the three-dimensional image data, wherein the set of input points comprises a first plurality of input points that represents the at least one tubular structure,
  determining a projection surface with respect to the three-dimensional image data,
  calculating a set of surface points of the projection surface, wherein for each input point of the set of input points a corresponding surface point of the set of surface points is calculated based on a projection of that input point onto the projection surface,
  calculating a deformed projection surface by applying a deformation algorithm onto the projection surface, the set of input points and the set of surface points, wherein each surface point of the set of surface points is moved to the corresponding input point of the set of input points,
  calculating a set of voxel positions with respect to the three-dimensional image data based on the deformed projection surface,
  calculating the two-dimensional unfolded image of the at least one tubular structure based on the three-dimensional image data and the set of voxel positions, and
  providing the two-dimensional unfolded image.

In another embodiment, the invention relates to a data processing system for providing a two-dimensional unfolded image of at least one tubular structure, the system comprising:
  an image data receiver for receiving three-dimensional image data of an examination region comprising the at least one tubular structure,
  an input selector for selecting a set of input points in the three-dimensional image data, wherein the set of input points comprises a first plurality of input points that represents the at least one tubular structure,
  a surface determiner for determining a projection surface with respect to the three-dimensional image data,
  a surface point calculator for calculating a set of surface points of the projection surface, wherein for each input point of the set of input points a corresponding surface point of the set of surface points is calculated based on a projection of that input point onto the projection surface, a deformation calculator for calculating a deformed projection surface by applying a deformation algorithm onto the projection surface, the set of input points and the set of surface points, wherein each surface point of the set of surface points is moved to the corresponding input point of the set of input points, a voxel position calculator for calculating a set of voxel positions with respect to the three-dimensional image data based on the deformed projection surface, an image calculator for calculating the two-dimensional unfolded image of the at least one tubular structure based on the three-dimensional image data and the set of voxel positions, and an image provider for providing the two-dimensional unfolded image.

In another embodiment, the data processing system is configured to implement the method according to one or more of the disclosed embodiments or aspects.

In one embodiment, the invention relates to a medical imaging device comprising a data processing system for providing a two-dimensional unfolded image of at least one tubular structure according to one or more of the disclosed aspects or embodiments.

In another embodiment, the invention relates to a computer program product comprising program elements which induce a data processing system to carry out the steps of the method according to one or more of the disclosed embodiments, when the program elements are loaded into a memory of the data processing system.

In another embodiment, the invention relates to a computer-readable medium on which program elements are stored that can be read and executed by a data processing system, in order to perform the steps of the method according to one or more of the disclosed embodiments, when the program elements are executed by the data processing system.

BRIEF DESCRIPTION OF THE DRAWINGS

The invention will be illustrated below with reference to the accompanying figures using example embodiments. The illustration in the figures is schematic and highly simplified and not necessarily to scale.

FIG. 4 shows several images illustrating consecutive intermediate results of the method for providing a two-dimensional unfolded image of at least one tubular structure.

FIG. 5 shows several images illustrating a planar unfolding of a vessel tree based on the method for providing a two-dimensional unfolded image.

DETAILED DESCRIPTION OF THE EXAMPLE EMBODIMENTS

Figure 1:
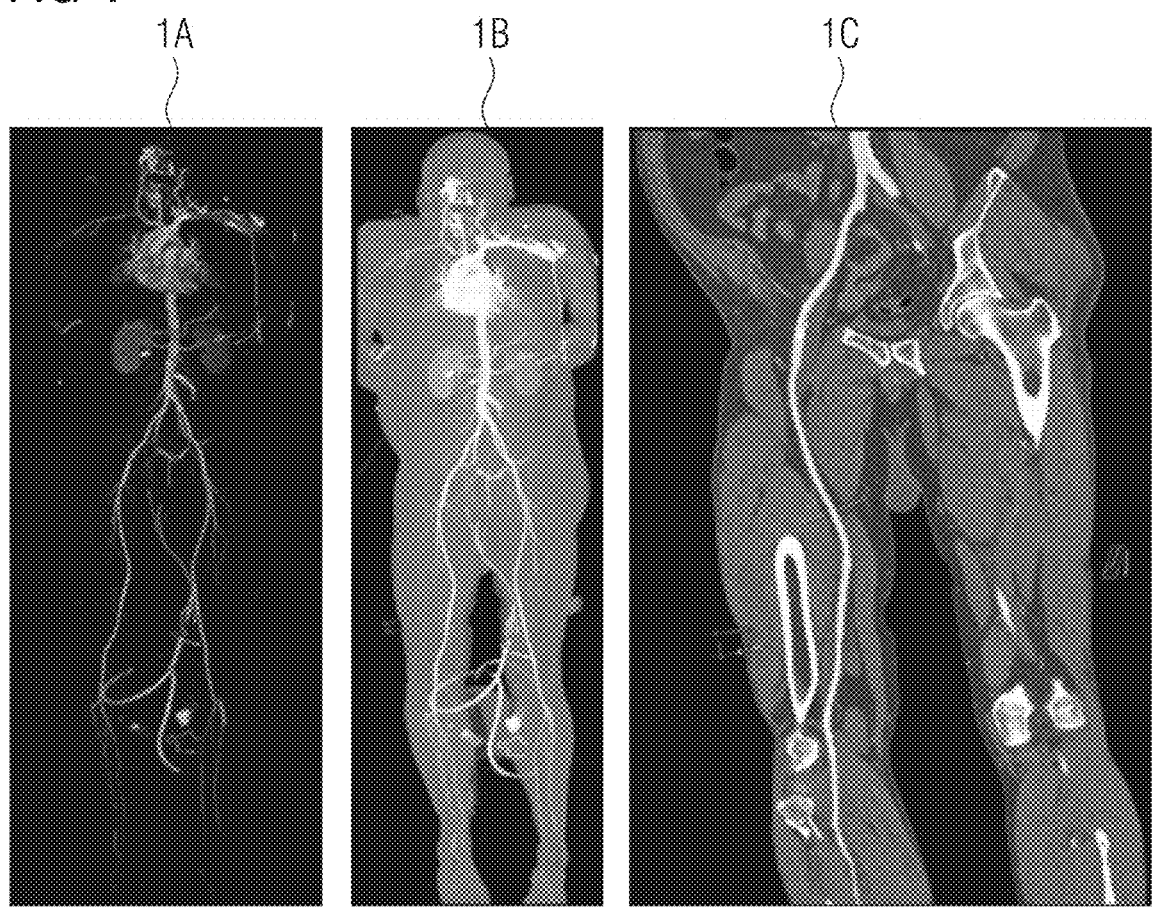
FIG. 1 and FIG. 2 show several images, each based on another method to visualize a vessel tree on a two-dimensional image.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In one embodiment, the invention relates to a computer-implemented method for providing a two-dimensional unfolded image of at least one tubular structure, the method comprising:
  receiving three-dimensional image data of an examination region comprising the at least one tubular structure,
  selecting a set of input points in the three-dimensional image data, wherein the set of input points comprises a first plurality of input points that represents the at least one tubular structure,
  determining a projection surface with respect to the three-dimensional image data,
  calculating a set of surface points of the projection surface, wherein for each input point of the set of input points a corresponding surface point of the set of surface points is calculated based on a projection of that input point onto the projection surface,
  calculating a deformed projection surface by applying a deformation algorithm onto the projection surface, the set of input points and the set of surface points, wherein each surface point of the set of surface points is moved to the corresponding input point of the set of input points,
  calculating a set of voxel positions with respect to the three-dimensional image data based on the deformed projection surface,
  calculating the two-dimensional unfolded image of the at least one tubular structure based on the three-dimensional image data and the set of voxel positions, and
  providing the two-dimensional unfolded image.

The at least one tubular structure can be, for example, an anatomical structure, in particular a branching anatomical structure. In another aspect the at least one tubular structure comprises a blood vessel tree and/or an airways tree. In particular, the at least one tubular structure can comprise a plurality of tubular sections of the at least one tubular structure. The tubular sections of the plurality of tubular sections can be arranged, for example, in a tree-like shape relative to each other.

The set of input points in the three-dimensional image data can be selected, for example, automatically and/or based on a corresponding manual user input. In particular, the set of input points in the three-dimensional image data can be selected by applying a segmentation algorithm and/or a centerline extraction algorithm onto the three-dimensional image data.

The set of input points can comprise, for example, for every tubular section of the plurality of tubular sections at least one input point that is located on a centerline of that tubular section. Each input point of the set of input points can be, for example, located on the centerline of a corresponding tubular section of the plurality of tubular sections.

The proposed method can provide a generic framework for the simultaneous visualization of multiple vessels in a single image. It may be applied, for example, to paired vessels, e.g. left/right carotids, left/right runoffs, or to more complex branching structures, like the coronary arteries.

In another aspect, the projection surface is of smooth geometry and/or comprises a regular mesh. The regular mesh can comprise, for example, a two-dimensional arrangement of nodes, in particular m×n nodes, wherein m and n are integers. The projection surface can extend at least over the whole projected anatomical structure, in particular over the whole image region of the three-dimensional image data.

In another aspect the projection surface is determined based on a mean-shape model of the at least one tubular structure and/or based on a mean-shape model of an organ to which the at least one tubular structure relates. Different projection geometries can be used for the projection surface. The projection surface can be, for example, a plane, a sphere, a cylinder or of a more complex shape. Thus, it is possible to select the geometry which matches best the anatomical structure to be visualized. For example, a projection surface in form of a sphere can be used for coronaries, a projection surface in form of a plane for the runoffs, or a customized geometry for vessels in the brain.

In another aspect, the orientation of the projection surface is normalized based on anatomical landmarks of the at least one tubular structure and/or based on anatomical landmarks of an organ to which the at least one tubular structure relates. For example, the projection surface can be an axial, sagittal or coronal plane.

In another example, the projection surface can be a best fitting plane and/or be determined based on a principal component analysis, in particular, of the at least one tubular structure and/or an organ to which the at least one tubular structure relates. For example, the heart is an organ to which the at least one tubular structure in form of coronary vessels relates.

The projection surface can be determined, for example, automatically and/or based on a corresponding manual user input. The projection surface can be, in particular, defined by a user using camera rotation in a VRT view.

In another aspect the deformation algorithm is based on an As-Rigid-As-Possible surface model. Examples of As-Rigid-As-Possible surface models are described in Reference 5. In particular, the Laplace operator of the mesh can be preserved during the deformation, resulting in a preservation of edge lengths and angles between the edges of the mesh. The deformation algorithm may comprise, for example, a nonlinear and/or iterative optimization.

After deformation, the voxel positions, in particular voxel positions corresponding to pixels of the two-dimensional unfolded image, can be created by interpolating the regular grid. The two-dimensional unfolded image can be sampled by extracting voxel values from the voxel positions.

In another aspect, overlapping parts of the at least one tubular structure are detected based on the set of input points and the set of surface points. Projection might introduce singularities, if two or more points of the at least one tubular structure are projected onto the same (or a very close) position on the projection surface. Such overlapping parts can include intersections between different projected vessels and self-intersections of a single vessel in the projection.

Some examples are a single vessel with a course orthogonal to the projection direction, a single vessel crossing itself in the projection and two vessel branches crossing each other in the projection. For two points of the at least one tubular structure that have a distance dp relative to each other on the projection surface and a distance do relative to each other in the three-dimensional image data, an overlap can be detected based on the ration ra=do/dp. If ra is higher than a specific threshold rt, an artifact due to overlap is detected. Artifacts in the two-dimensional unfolded image due to overlapping parts can be avoided, for example, based on at least one of the following approaches.

In another aspect, at least one of the detected overlapping parts of the at least one tubular structure is excluded from the projection onto the projection surface based on a priority measure. A first approach to resolve those artifacts is to exclude artifact-creating, less important parts of the vessel tree using a prioritization approach. Importance is introduced using a priority measure, which is assigned to each vessel point and/or to each of the overlapping parts of the at least one tubular structure. Main branches, larger branches and branches with lesions get a higher priority. Proximal vessel points get a higher priority than distal vessel points. By removing low priority vessel points creating ambiguities during projection, the visual quality is improved in higher priority vessels.

In another aspect, the projection comprises a stretching operation. A second approach to resolve those artifacts is to modify the projection so that orthogonal course and/or overlaps are avoided. For example, the projection algorithm can be extended by applying a stretching operation. For example, the projection can be based on a mean projection course that is calculated for each branch of the at least one tubular structure.

In another aspect, at least one reference marker is determined on the at least one tubular structure in the three-dimensional image data,
wherein for those input points of the set of input points that are located in a region of the at least one reference marker a parallel projection onto the projection surface is used,
wherein for those input points of the set of input points that are located outside of the region of the at least one reference marker a radial projection onto the projection surface is used.

Distortion artifacts might be introduced by varying distances to the projection center for radial projections, in particular spherical or cylindrical projections. In case of radial sampling (e.g. cylindrical/sphere projection), the anatomy might be distorted in the output image, because varying distances to the projection center cause varying projection angles. Vessel parts located far away from the projection center can show narrowing artifacts, while parts very close to the projection center can show widening artifacts. These distortions can already be corrected during projection. At least one reference marker, for example of the vessel wall, can be determined. To the at least one reference marker, parallel projection can be applied instead of the radial projection.

In another aspect, the set of input points further comprises a second plurality of input points that represents annotation information related to the at least one tubular structure. The two-dimensional unfolded image can serve as an overview image showing vessels, potential lesions and surrounding anatomy in one picture. In addition to the image information, it can further show annotation information as overlays on the unfolded image.

The annotation information, for example in form of a three-dimensional structure in the three-dimensional image data, can be projected onto the projection surface essentially in the same way as the at least one tubular structure. The annotation information may comprise, for example, a centerline tree, a segmented lumen, branch labels or lesion markers. Bases on the two-dimensional unfolded image, an interactive navigation through the vessel tree can be implemented, findings can be created. Furthermore, anatomical landmarks and/or landmarks needed for interventions can be added to the two-dimensional unfolded image.

In another aspect, the two-dimensional unfolded image is displayed in a user interface,
wherein a branch of the at least one tubular structure is determined in the two-dimensional unfolded image based on a manual user input,
wherein a curved planar reformatted image and/or a cross-sectional image of the determined branch is displayed in the user interface.

The proposed method of an embodiment can enable a navigation workflow from global to local views and vice versa using a synchronized position marker. For example, a navigation marker of the user interface can be moved in the two-dimensional unfolded image based on the manual user input. Moving the marker along a projected tree on the two-dimensional unfolded image (global view) automatically selects the corresponding vessel, so that a CPR (intermediate view) shows this single vessel, allowing to investigate it interactively in a more detailed view.

Meanwhile, a third view (local view) shows a cross-section of the selected vessel at the selected position. In a classic workflow, investigating each vessel one after another would involve looking at common vessel parts multiple times. By navigating through the two-dimensional unfolded image, this can be avoided.

In another embodiment, the invention relates to a data processing system for providing a two-dimensional unfolded image of at least one tubular structure, the system comprising:
an image data receiver for receiving three-dimensional image data of an examination region comprising the at least one tubular structure,
an input selector for selecting a set of input points in the three-dimensional image data, wherein the set of input points comprises a first plurality of input points that represents the at least one tubular structure,
a surface determiner for determining a projection surface with respect to the three-dimensional image data,
a surface point calculator for calculating a set of surface points of the projection surface, wherein for each input point of the set of input points a corresponding surface point of the set of surface points is calculated based on a projection of that input point onto the projection surface,
a deformation calculator for calculating a deformed projection surface by applying a deformation algorithm onto the projection surface, the set of input points and the set of surface points, wherein each surface point of the set of surface points is moved to the corresponding input point of the set of input points,
a voxel position calculator for calculating a set of voxel positions with respect to the three-dimensional image data based on the deformed projection surface,
an image calculator for calculating the two-dimensional unfolded image of the at least one tubular structure based on the three-dimensional image data and the set of voxel positions, and
an image provider for providing the two-dimensional unfolded image.

In another embodiment, the data processing system is configured to implement the method according to one or more of the disclosed embodiments or aspects.

In one embodiment, the invention relates to a medical imaging device comprising a data processing system for providing a two-dimensional unfolded image of at least one tubular structure according to one or more of the disclosed aspects or embodiments.

The medical imaging device may be, for example, a computed tomography (CT) device or a magnetic resonance imaging (MRI) device or a combination of different medical imaging modalities, for example, a PET-CT-imaging device. The three-dimensional image data can be acquired, for example, by the medical imaging device. The three-dimensional image data can comprise medical imaging data, for example computed tomography medical imaging data and/ or magnetic resonance medical imaging data.

In another embodiment, the invention relates to a computer program product comprising program elements which induce a data processing system to carry out the steps of the method according to one or more of the disclosed embodiments, when the program elements are loaded into a memory of the data processing system.

In another embodiment, the invention relates to a computer-readable medium on which program elements are stored that can be read and executed by a data processing system, in order to perform the steps of the method according to one or more of the disclosed embodiments, when the program elements are executed by the data processing system.

The computer program product can be, for example, a computer program or comprise another element apart from the computer program. This other element can be hardware, for example a memory device, on which the computer program is stored, a hardware key for using the computer program and the like, and/or software, for example, a documentation or a software key for using the computer program. A computer-readable medium can be embodied as non-permanent main memory (e.g. random-access memory) or as permanent mass storage (e.g. hard disk, USB stick, SD card, solid state disk).

The data processing system can comprise, for example, at least one of a cloud-computing system, a distributed computing system, a computer network, a computer, a tablet computer, a smartphone or the like. The data processing system can comprise hardware and/or software. The hardware can be, for example, a processor system, a memory system and combinations thereof. The hardware can be configurable by the software and/or be operable by the software. Calculations for performing an action of a method may be carried out in a processor.

Data, in particular the three-dimensional image data, can be received, for example, by receiving a signal that carries the data and/or by reading the data from a computer-readable medium and/or by receiving an input through a user interface. Data, in particular, the two-dimensional unfolded image can be provided, for example, by transmitting a signal that carries the data and/or by writing the data into a computer-readable medium and/or by displaying the data on a display.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

In the context of embodiments of the present invention, the expression "based on" can in particular be understood as meaning "using, inter alia". In particular, wording according to which a first feature is calculated (or generated, determined etc.) based on a second feature does not preclude the possibility of the first feature being calculated (or generated, determined etc.) based on a third feature.

Reference is made to the fact that the described methods and the described units are merely preferred example embodiments of the invention and that the invention can be varied by a person skilled in the art, without departing from the scope of the invention as it is specified by the claims.

Figure 2:
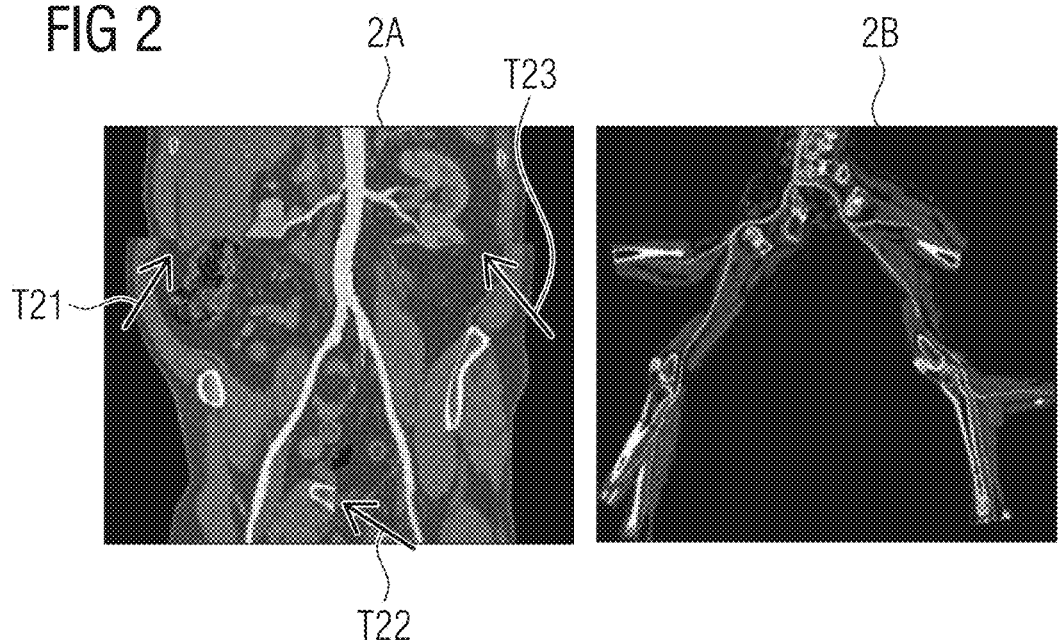

FIG. 1 and FIG. 2 show several images, each based on another method to visualize a vessel tree on a two-dimensional image.

Image 1A is based on a bone-removed volume rendering technique (VRT). Image 1B is based on a bone-removed maximum intensity projection (MIP). Both methods can visualize a whole vessel tree, but without the exact CT HU values. Image 1C is based on a stretched curved planar reformation (CPR) of a single vessel, without relation within the vessel tree.

Image 2A is based on a multi-path CPR and shows several connected branches of a vessel tree. Each of the arrows T21, T22 and T23 points to a corresponding region border artifact. Image 2B shows a rotated (untangled) multi-path CPR, where the anatomical context is lost due to rotations of the single segments.

Figure 3:
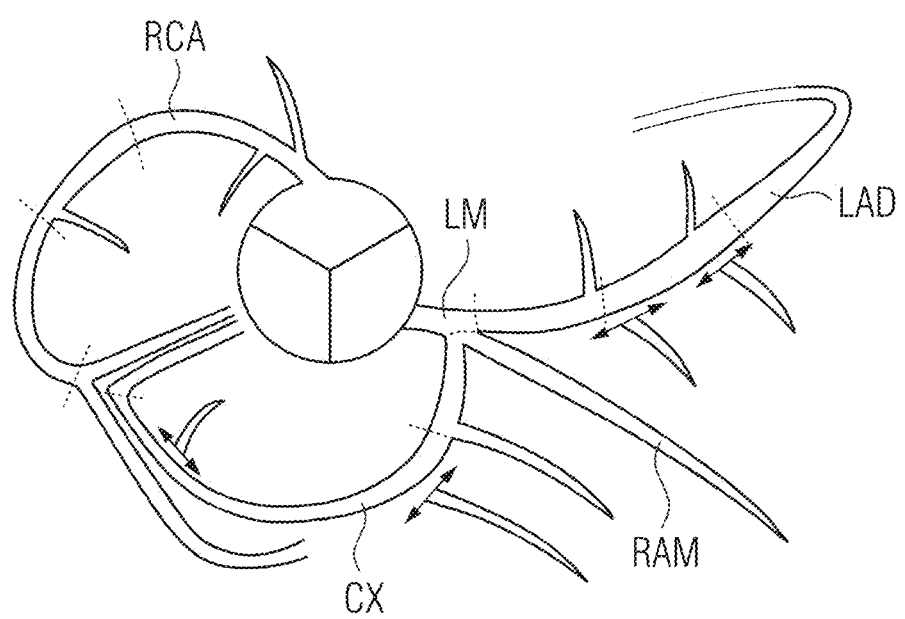
FIG. 3 shows a schematic overview image of the coronary vessel tree.

FIG. 3 shows a schematic overview image of the coronary vessel tree according to the SCCT guidelines for interpreting and reporting coronary computed tomographic angiography (CCTA) [Reference 4]. The coronary arteries are roughly depicted like they are typically visible when stepping through a set of CT slices in classical axial multiplanar reconstructed (MPR) images. In FIG. 3, the Right Coronary Artery RCA, the Left Main (LM), the Left Anterior Descending (LDA), the Circumflex (CX) and the Ramus (RAM) are shown.

The SCCT defines the coronary segments based on this depiction, which simplifies communication of diagnostic findings, e.g. in a clinical report. However, since this is only a schematic image, patient-specific anatomy and corresponding CT HU values are not visible.

The proposed method for providing a two-dimensional unfolded image has the potential to replace schematic views used in clinical reports, like e.g. the schematic image of the coronary arteries proposed in the SCCT guidelines, as it allows to display patient specific anatomy in a normalized way.

For the coronaries, a view similar to the schematic overview images proposed in the SCCT guidelines, can be created. This view shows the aorta in the center, and ostia for the left coronary tree placed at the bottom right, and ostia for the right coronary tree placed at the upper left. Communication between radiologists or with the patient can also be improved, because perception is simplified.

FIG. 4 shows several images illustrating consecutive intermediate results of the method for providing a two-dimensional unfolded image 2I of at least one tubular structure S.

Image 4A illustrates the definition of a smooth three-dimensional projection geometry in form of a projection surface M with a regular surface mesh and m×n nodes, extending over the anatomical structure S, and the projection of the anatomical structure S onto the projection surface M.

Each input point P1, P2, P3 of the set of input points is projected onto a corresponding surface point P1', P2', P3' of the set of surface points along a corresponding projection line of the plurality of projection lines N. The output of the projection is the projected anatomical structure S' comprising the surface points P1', P2' and P3'.

Image 4B illustrates the deformation of the initial surface mesh M towards the anatomical structure S so that the anatomical structure S is located directly in the deformed projection surface MD. During the deformation, nodes at the surface points P1', P2' and P3' are moved towards their corresponding anatomical positions P1, P2 and P3. In addition to the subset of nodes located at the projected anatomical structure S', the remaining nodes of the projection surface M need to be moved in a suitable way to preserve the initial, smooth geometry of the projection surface M.

Image 4C illustrates the creation of voxel positions V for the two-dimensional unfolded image 2I by interpolating the regular grid after deformation. Here the benefit of using a regular surface mesh arises. No ray casting is necessary to define the voxel positions. Finally, the two-dimensional unfolded image 2I is sampled by extracting interpolated voxel values at the three-dimensional voxel positions as shown in image 4D.

FIG. 5 shows several images illustrating a planar unfolding of a vessel tree based on the method for providing a two-dimensional unfolded image 2I. The vessel tree comprises aorta, carotids, vertebralis, renal vessels and leg vessels.

Image 5A shows the anatomical structure S represented by a three-dimensional tree of vessel centerlines, the projection surface M in form of a coronal plane and a plurality of projection lines N illustrating the orthogonal projection.

Image 5B shows the deformed projection surface MD. Image 5C shows the two-dimensional unfolded image 2I. In the images 5B and 5C the mesh resolution was down sampled for better illustration.

Figure 6:
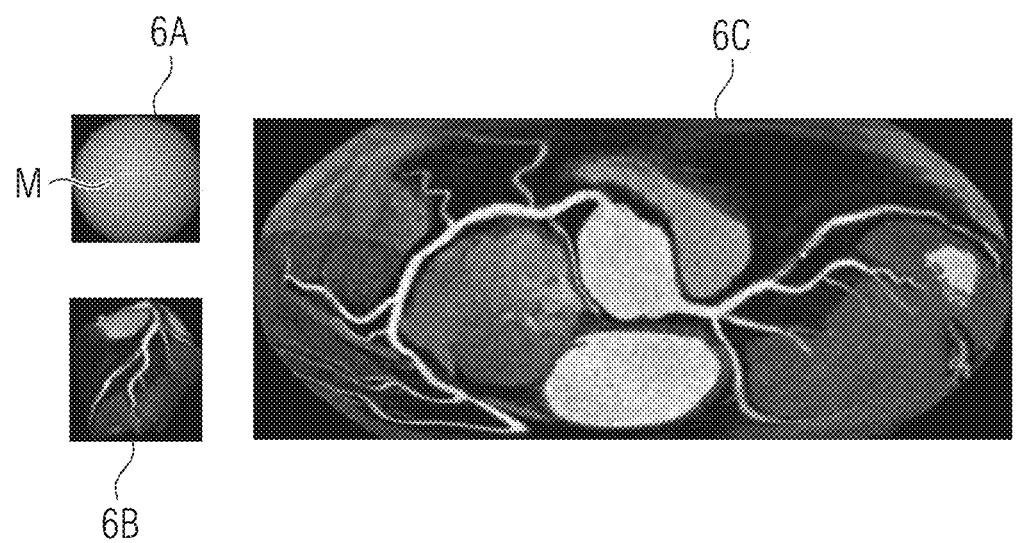
FIG. 6 shows several images illustrating a spherical unfolding of the coronary arteries based on the method for providing a two-dimensional unfolded image.

FIG. 6 shows several images illustrating a spherical unfolding of the coronary arteries based on the method for providing a two-dimensional unfolded image 2I.

Image 6A shows the projection surface M in form of a UV-sphere. The center of gravity of the heart mask is used as sphere center. Orientation is normalized by rotating the sphere such that the aorta lies on the 0th latitude/longitude and the 0th latitude extends along the x-direction of the axial slice. The vessel tree is projected onto the sphere.

Image 6B shows the deformed sphere MD with image data texture overlay.

Image 6C shows the two-dimensional unfolded image 2I with normalized orientation. For the sampling of the two-dimensional unfolded image 2I, a map projection, for example, a Robinson projection, is used to minimize distortion near the north and south pole of the sphere.

Figure 7:
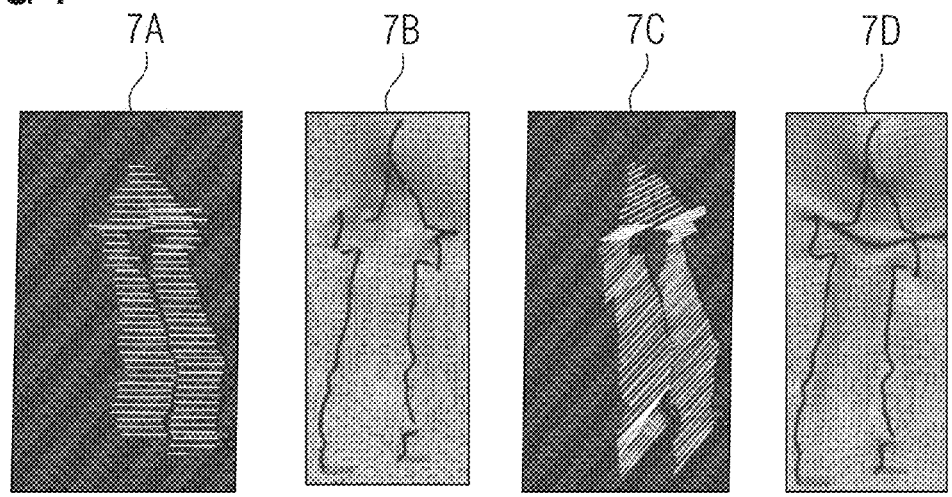
FIG. 7 and FIG. 8 show several images illustrating artifact reduction based on the direction of the projection onto the projection surface.
Figure 8:
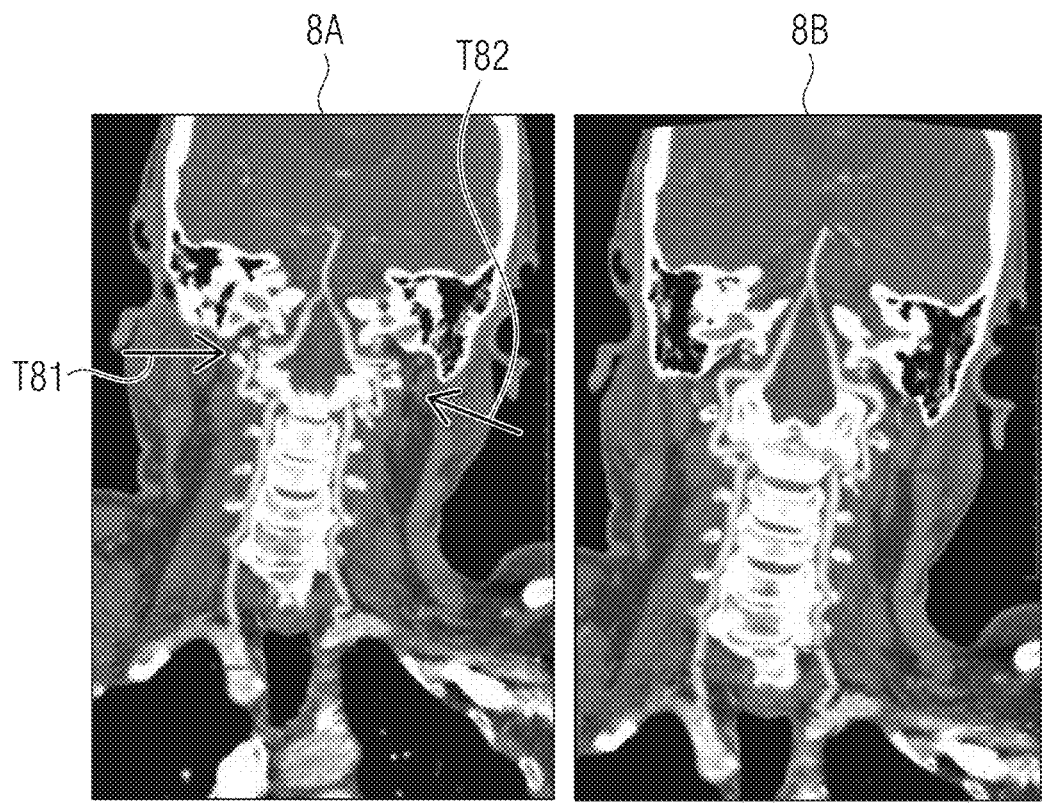

FIG. 7 and FIG. 8 show several images illustrating artifact reduction based on the direction of the projection onto the projection surface M. An orthogonal projection as shown in the images 7A and 7B introduces artifacts T81, T82 at vessel regions with orthogonal course as shown in image 8A. Those artifacts are resolved using stretched projection as shown in the images 7C, 7D and 8B, wherein the vessels are stretched along their projection course.

Figure 9:
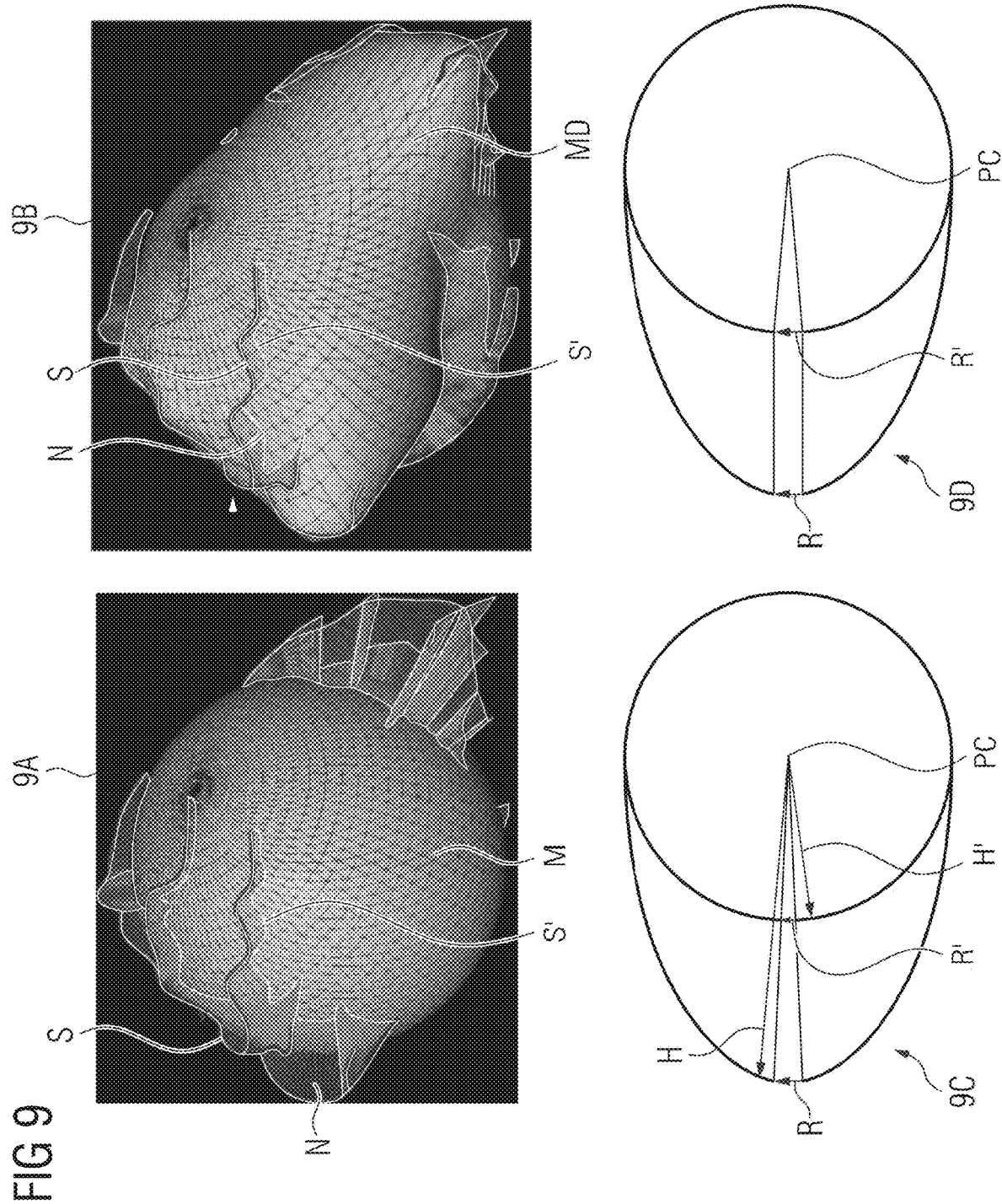
FIG. 9 and FIG. 10 show several images illustrating distortion correction in case of radial sampling.
Figure 10:
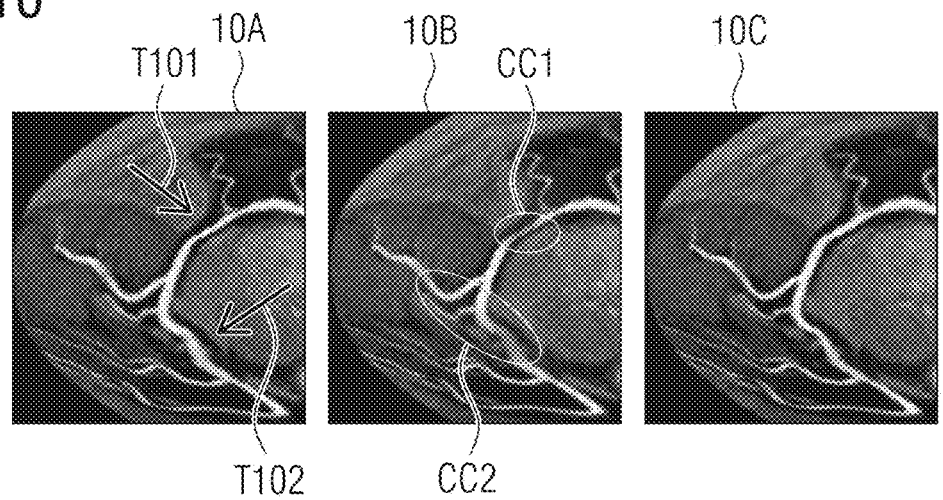

FIG. 9 and FIG. 10 show several images illustrating distortion correction in case of radial sampling. Image 9A shows a spherical projection surface M for coronary unfolding. Image 9B shows the deformed projection surface MD. Image 9C shows a vessel with radius R that is projected onto a sphere with radius H'. Since the vessel has a larger distance H to the projection center PC, the projected vessel radius R' gets smaller. Following our distortion correction approach, additional reference markers at the vessel wall are projected onto the sphere using a parallel projection instead of projecting them radially towards the projection center. Thereby the vessel radius is preserved during projection as shown in image 9D.

Image 10A shows an example for the two-dimensional unfolded image 2I of the coronary arteries based on the proposed method for providing a two-dimensional unfolded image 2I without height distortion correction. The arrow T101 points to a narrowing artifact which could be misinterpreted as a stenosis of the RCA. The arrow T102 points to a widening artifact.

The narrowing and widening artifacts arise due to different projection angles. Vessel parts with large distances to the sphere center appear smaller due to smaller projection angles. Vessel parts with smaller distances to the sphere center appear larger due to larger projection angles. In image 10B, vessel parts in the region CC1 have large distances to the projection center PC and vessel parts in the region CC2 have small distances to the projection center PC. The distances to the projection center PC can be displayed in the image based on color-coding. For example the region CC1 could be color-coded in red and the region CC2 could be color-coded in blue.

As shown in image 10C, artifacts are removed after distortion correction. After height correction, those vessel parts, for example visible on the RCA in image 10A, appear in their actual size, such that artificial stenoses are avoided.

Figure 11:
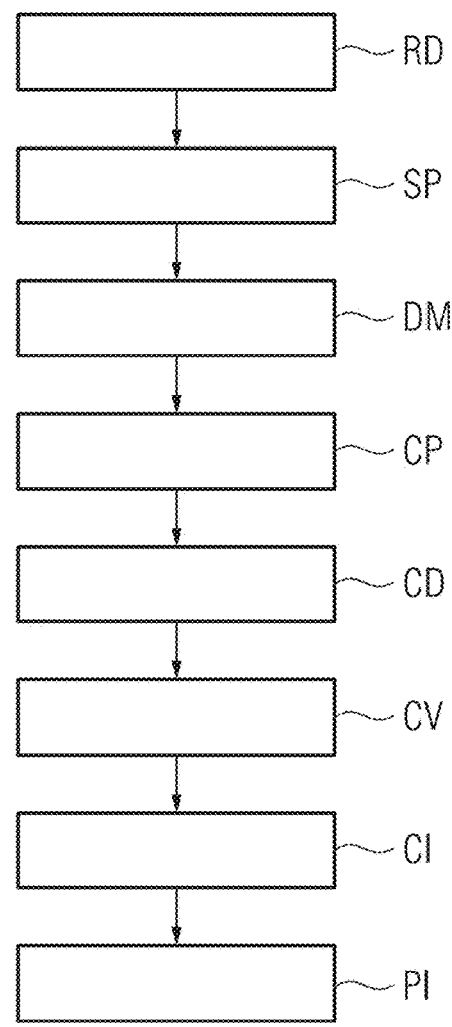
FIG. 11 shows a diagram illustrating a computer-implemented method for providing a two-dimensional unfolded image of at least one tubular structure.

FIG. 11 shows a diagram illustrating a computer-implemented method for providing a two-dimensional unfolded image 2I of at least one tubular structure S, the method comprising receiving RD three-dimensional image data of an examination region comprising the at least one tubular structure S, selecting SP a set of input points in the three-dimensional image data, wherein the set of input points comprises a first plurality of input points that represents the at least one tubular structure S, determining DM a projection surface M with respect to the three-dimensional image data, calculating CP a set of surface points of the projection surface M, wherein for each input point of the set of input points a corresponding surface point of the set of surface points is calculated based on a projection of that input point onto the projection surface M, calculating CD a deformed projection surface MD by applying a deformation algorithm onto the projection surface M, the set of input points and the set of surface points, wherein each surface point of the set of surface points is moved to the corresponding input point of the set of input points, calculating CV a set of voxel positions with respect to the three-dimensional image data based on the deformed projection surface MD, calculating CI the two-dimensional unfolded image 2I of the at least one tubular structure S based on the three-dimensional image data and the set of voxel positions, and providing PI the two-dimensional unfolded image 2I.

Figure 12:
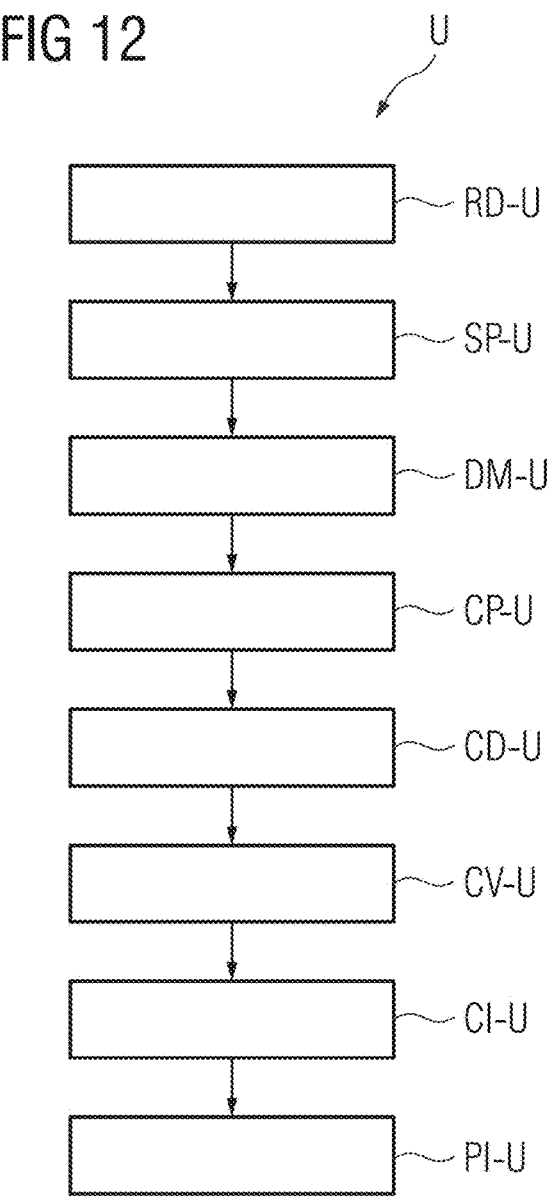
FIG. 12 shows a data processing system U for providing a two-dimensional unfolded image of at least one tubular structure.

FIG. 12 shows a data processing system U for providing a two-dimensional unfolded image 2I of at least one tubular structure S, the system comprising an image data receiver RD-U for receiving RD three-dimensional image data of an examination region comprising the at least one tubular structure S, an input selector SP-U for selecting SP a set of input points in the three-dimensional image data, wherein the set of input points comprises a first plurality of input points that represents the at least one tubular structure S, a surface determiner DM-U for determining DM a projection surface M with respect to the three-dimensional image data, a surface point calculator CP-U for calculating CP a set of surface points of the projection surface M, wherein for each input point of the set of input points a corresponding surface point of the set of surface points is calculated based on a projection of that input point onto the projection surface M, a deformation calculator CD-U for calculating CD a deformed projection surface MD by applying a deformation algorithm onto the projection surface M, the set of input points and the set of surface points, wherein each surface point of the set of surface points is moved to the corresponding input point of the set of input points, a voxel position calculator CV-U for calculating CV a set of voxel positions with respect to the three-dimensional image data based on the deformed projection surface MD, an image calculator CI-U for calculating CI the two-dimensional unfolded image 2I of the at least one tubular structure S based on the three-dimensional image data and the set of voxel positions, and an image provider PI-U for providing PI the two-dimensional unfolded image 2I.

Figure 13:
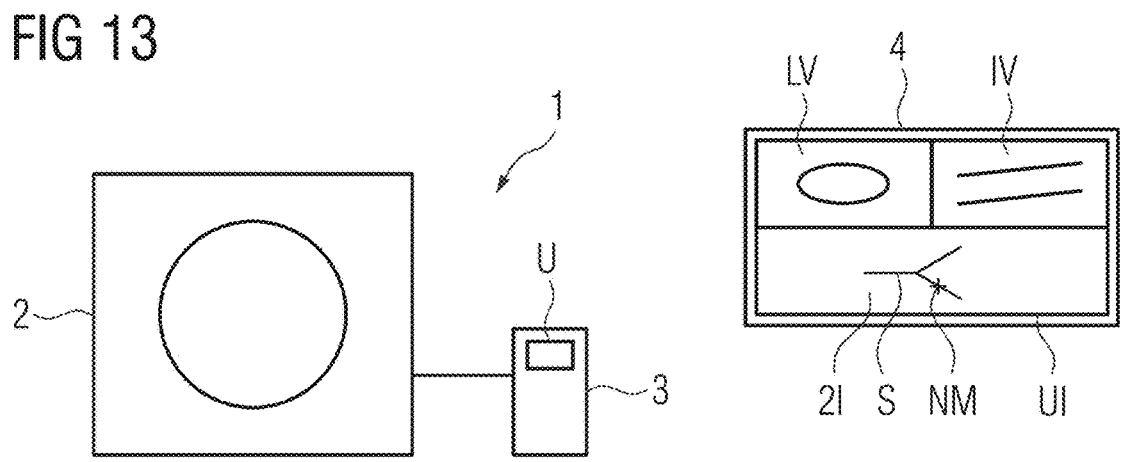
FIG. 13 shows a medical imaging device 1, comprising the data processing system.

FIG. 13 shows a medical imaging device 1, comprising the computer 3 with the data processing system U and an acquisition system 2 configured to acquire the three-dimensional image data. The medical imaging system can be, for example, a computed tomography device or a magnetic resonance imaging device.

The medical imaging device 1 further comprises a display 4, for example in form of a touch screen, displaying the user interface UI. The two-dimensional unfolded image 2I is displayed in the user interface UI. A branch of the at least one tubular structure S is determined in the two-dimensional unfolded image 2I based on a manual user input, the manual user input setting the navigation marker NM. A curved planar reformatted image IV of the determined branch and a cross-sectional image LV of the determined branch at the position of the navigation marker is displayed in the user interface UI.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

REFERENCES

1. Kanitsar, A. et al.: 2002. CPR: curved planar reformation. In Proceedings of the conference on Visualization '02 (VIS '02). IEEE Computer Society, Washington, D.C., USA, 37-44.
2. Kanitsar, A. et al.: 2003. Advanced Curved Planar Reformation: Flattening of Vascular Structures. In Proceedings of the 14th IEEE Visualization 2003 (VIS '03). IEEE Computer Society, Washington, D.C., USA, 7-.
3. Lavi, G. A.: 2004: Mapping the coronary arteries on a sphere in CT angiography. Proc. SPIE 5367, Medical Imaging 2004: Visualization, Image-Guided Procedures, and Display, (5 May 2004)
4. Raff, G. L., et al: SCCT guidelines for the interpretation and reporting of coronary computed tomographic angiography. Journal of Cardiovascular Computed Tomography (2009) 3, 122-136
5. Sorkine, O., et al: As-Rigid-As-Possible Surface Modeling. EUROGRAPHICS/ACM SIGGRAPH Symposium on Geometry Processing (2007), 109-116
6. U.S. Pat. No. 7,447,535B2—Mapping the coronary arteries on a sphere
7. US20190057541A1—Planar visualization of anatomical structures

What is claimed is:

1. A computer-implemented method for providing a two-dimensional unfolded image of at least one tubular structure, the method comprising:

receiving three-dimensional image data of an examination region including the at least one tubular structure;

selecting a set of input points in the three-dimensional image data, the set of input points including a first plurality of input points representing the at least one tubular structure;

determining a projection surface with respect to the three-dimensional image data;

calculating a set of surface points of the projection surface, wherein for each respective input point of the set of input points, a respective corresponding surface point of the set of surface points is calculated based on a projection of the respective input point onto the projection surface;

calculating a deformed projection surface by applying a deformation algorithm onto the projection surface, the set of input points and the set of surface points, wherein each respective surface point of the set of surface points is moved to the respective corresponding input point of the set of input points;

calculating a set of voxel positions with respect to the three-dimensional image data based on the deformed projection surface; and calculating the two-dimensional unfolded image of the at least one tubular structure based on the three-dimensional image data and the set of voxel positions, wherein overlapping parts of the at least one tubular structure are detected based on the set of input points and the set of surface points, and wherein at least one of the overlapping parts of the at least one tubular structure detected is excluded from the projection onto the projection surface based on a priority measure.

2. The method of claim 1, wherein the at least one tubular structure includes a blood vessel tree or an airways tree.

3. The method of claim 2, wherein the projection surface is of smooth geometry and includes a regular mesh.

4. The method of claim 1, wherein the projection surface is of smooth geometry and includes a regular mesh.

5. The method of claim 1, wherein the projection surface is determined based on at least one of a mean-shape model of the at least one tubular structure and a mean-shape model of an organ to which the at least one tubular structure relates.

6. The method of claim 1, wherein an orientation of the projection surface is normalized based on at least one of anatomical landmarks of the at least one tubular structure and anatomical landmarks of an organ to which the at least one tubular structure relates.

7. The method of claim 1, wherein the deformation algorithm is based on an As-Rigid-As-Possible surface model.

8. The method of claim 1, wherein the projection includes a stretching operation.

9. The method of claim 1,
wherein at least one reference marker is determined on the at least one tubular structure in the three-dimensional image data,
wherein for input points of the set of input points located in a region of the at least one reference marker, a parallel projection onto the projection surface is used, and
wherein for input points of the set of input points located outside of the region of the at least one reference marker, a radial projection onto the projection surface is used.

10. The method of claim 1, wherein the set of input points further includes a second plurality of input points, representing annotation information related to the at least one tubular structure.

11. The method of claim 1,
wherein the two-dimensional unfolded image is displayed in a user interface,
wherein a branch of the at least one tubular structure is determined in the two-dimensional unfolded image based on a manual user input, and
wherein at least one of a curved planar reformatted image and a cross-sectional image of the determined branch is displayed in the user interface.

12. A non-transitory computer program product storing program elements which induce a data processing system to carry out the method of claim 1, when the program elements are loaded into a memory of the data processing system and subsequently executed.

13. A non-transitory computer-readable medium storing program elements, readable and executable by a data processing system to perform the method according of claim 1, when the program elements are executed by the data processing system.

14. The method of claim 1, further comprising:
providing the two-dimensional unfolded image.

15. A data processing system for providing a two-dimensional unfolded image of at least one tubular structure, the system comprising:

an image data receiver to receive three-dimensional image data of an examination region including the at least one tubular structure;
an input selector to select a set of input points in the three-dimensional image data, the set of input points including a first plurality of input points representing the at least one tubular structure;
a surface determiner to determine a projection surface with respect to the three-dimensional image data;
a surface point calculator to calculate a set of surface points of the projection surface, wherein for each respective input point of the set of input points, a respective corresponding surface point of the set of surface points is calculated based on a projection of the respective input point onto the projection surface;
a deformation calculator to calculate a deformed projection surface by applying a deformation algorithm onto the projection surface, the set of input points and the set of surface points, wherein each respective surface point of the set of surface points is moved to the corresponding respective input point of the set of input points;
a voxel position calculator to calculate a set of voxel positions with respect to the three-dimensional image data based on the deformed projection surface; and
an image calculator to calculate the two-dimensional unfolded image of the at least one tubular structure based on the three-dimensional image data and the set of voxel positions,
wherein overlapping parts of the at least one tubular structure are detected based on the set of input points and the set of surface points, and
wherein at least one of the overlapping parts of the at least one tubular structure detected is excluded from the projection onto the projection surface based on a priority measure.

16. The data processing system of claim 15, further comprising an image provider to provide the two-dimensional unfolded image.

17. A medical imaging device, comprising the data processing system of claim 15.

18. The data processing system of claim 15, wherein the at least one tubular structure includes a blood vessel tree or an airways tree.

19. The data processing system of claim 15,
wherein at least one reference marker is determined on the at least one tubular structure in the three-dimensional image data,
wherein for input points of the set of input points located in a region of the at least one reference marker, a parallel projection onto the projection surface is used, and
wherein for input points of the set of input points located outside of the region of the at least one reference marker, a radial projection onto the projection surface is used.

20. The data processing system of claim 15,
wherein the two-dimensional unfolded image is displayed in a user interface,
wherein a branch of the at least one tubular structure is determined in the two-dimensional unfolded image based on a manual user input, and
wherein at least one of a curved planar reformatted image and a cross-sectional image of the determined branch is displayed in the user interface.

* * * * *